US012812591B2

(12) United States Patent
Reddy et al.

(10) Patent No.: US 12,812,591 B2
(45) Date of Patent: Nov. 24, 2026

(54) INTER-CLUSTER COORDINATION CONFIGURATION FOR ULTRA-WIDEBAND (UWB) WIRELESS POSITIONING

(71) Applicant: QUALCOMM Incorporated, San Diego, CA (US)

(72) Inventors: Varun Amar Reddy, San Diego, CA (US); Alexandros Manolakos, Athens (GR); Pooria Pakrooh, San Marcos, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 18/862,417

(22) PCT Filed: May 22, 2023

(86) PCT No.: PCT/US2023/023146
§ 371 (c)(1),
(2) Date: Nov. 1, 2024

(87) PCT Pub. No.: WO2024/015143
PCT Pub. Date: Jan. 18, 2024

(65) Prior Publication Data

US 2025/0294504 A1 Sep. 18, 2025

(30) Foreign Application Priority Data

Jul. 12, 2022 (GR) .............................. 20220100552

(51) Int. Cl.
*H04W 64/00* (2009.01)
*H04B 1/7163* (2011.01)
(Continued)

(52) U.S. Cl.
CPC .......... *H04W 64/00* (2013.01); *H04B 1/7163* (2013.01); *H04B 7/0626* (2013.01); *H04B 17/346* (2023.05)

(58) Field of Classification Search
CPC ... H04W 64/00; H04B 17/346; H04B 1/7163; H04B 7/0626
(Continued)

(56) References Cited

U.S. PATENT DOCUMENTS 10,506,456 B2 12/2019 Lou et al.
2006/0140249 A1* 6/2006 Kohno ................. H04B 1/7172 375/130

(Continued)

FOREIGN PATENT DOCUMENTS

EP 3681045 A1 7/2020

OTHER PUBLICATIONS

International Search Report and Written Opinion—PCT/US2023/023146—ISA/EPO—Sep. 26, 2023.

*Primary Examiner* — Mark G. Pannell
(74) *Attorney, Agent, or Firm* — Weaver Austin Villeneuve & Sampson/QUALCOMM Incorporated

(57) ABSTRACT

In some implementations, a method for cross-cluster coordination in ultra-wideband (UWB) wireless positioning performed by an initiator of a first cluster, the method comprising receiving, from a controller of a plurality of clusters that includes the first cluster, a request for a channel scan report (CSR) indicating interferences in a wireless positioning performed by the first cluster, wherein the interferences are caused by information exchange among the plurality of clusters, generating an interference profile of the first cluster based on one or more radio frequency (RF) scans performed during a ranging block in a UWB positioning session, determining the CSR based on the interference profile of the
(Continued)

first cluster, and transmitting, the CSR to the controller for scheduling information exchange among the plurality of clusters.

31 Claims, 13 Drawing Sheets

(51) Int. Cl.
*H04B 7/06* (2006.01)
*H04B 17/309* (2015.01)
*H04W 84/18* (2009.01)

(58) Field of Classification Search
USPC ........................................................ 455/456.1
See application file for complete search history.

(56) References Cited

U.S. PATENT DOCUMENTS

| | | | | |
|---|---|---|---|---|
| 2007/0206631 | A1* | 9/2007 | Parts | H04W 72/1215 370/465 |
| 2009/0168800 | A1* | 7/2009 | Leinonen | H04B 1/3805 370/464 |
| 2016/0259032 | A1* | 9/2016 | Hehn | G01S 1/024 |
| 2020/0100283 | A1* | 3/2020 | Naguib | B60R 25/24 |
| 2022/0386214 | A1* | 12/2022 | Kim | H04W 40/026 |
| 2023/0039932 | A1* | 2/2023 | Booij | G01S 11/14 |
| 2025/0365033 | A1* | 11/2025 | Kuelzer | H04W 72/541 |

* cited by examiner

INTER-CLUSTER COORDINATION CONFIGURATION FOR ULTRA-WIDEBAND (UWB) WIRELESS POSITIONING

RELATED APPLICATIONS

This application is a National Phase entry of International Application No. PCT/US2023/023146, filed May 22, 2023, entitled "INTER-CLUSTER COORDINATION CONFIGURATION FOR ULTRA-WIDEBAND (UWB) WIRELESS POSITIONING" which claims the benefit of Greek application No. 20220100552, filed Jul. 12, 2022, entitled "INTER-CLUSTER COORDINATION CONFIGURATION FOR ULTRA-WIDEBAND (UWB) WIRELESS POSITIONING", both of which are assigned to the assignee hereof, and incorporated herein in their entirety by reference.

BACKGROUND

1. Field of Disclosure

The present disclosure relates generally to the field of radiofrequency (RF)-based position determination (or positioning) of an electronic wireless device. More specifically, the present disclosure relates to ultra-wideband (UWB)-based positioning.

2. Description of Related Art

The positioning of devices can have a wide range of consumer, industrial, commercial, military, and other applications. UWB-based positioning offers a highly-accurate, low-power positioning solution relative to other RF-based positioning techniques for wireless electronic devices.

BRIEF SUMMARY

An example method for cross-cluster coordination in ultra-wideband (UWB) wireless positioning performed by an initiator of a first cluster, the method comprising receiving, from a controller of a plurality of clusters that includes the first cluster, a request for a channel scan report (CSR) indicating interferences in a wireless positioning performed by the first cluster, wherein the interferences are caused by information exchange among the plurality of clusters, generating an interference profile of the first cluster based on one or more radio frequency (RF) scans performed during a ranging block in a UWB positioning session, determining the CSR based on the interference profile of the first cluster, and transmitting, the CSR to the controller for scheduling information exchange among the plurality of clusters.

An example method of cross-cluster coordination in ultra-wideband (UWB) positioning performed by a controller of a plurality of clusters, the method comprising configuring an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session, receiving, from the initiator, the CSR, and scheduling information exchange among the plurality of clusters based on the CSR.

An example transmitting device in a wireless communication network, comprising a wireless communication interface and one or more processing units communicatively coupled to the wireless communication interface and the memory, the one or more processing units configured to receive, from a controller of a plurality of clusters that includes the first cluster, a request for a channel scan report (CSR) indicating interferences in a wireless positioning performed by the first cluster, wherein the interferences are caused by information exchange among the plurality of clusters, determine, the CSR by generating an interference profile of the first cluster based on one or more radio frequency (RF) scans performed during a ranging block in a UWB positioning session, and transmit, the CSR to the controller for scheduling information exchange among the plurality of clusters.

An example server comprising a transceiver, a memory, and one or more processing units communicatively coupled with the transceiver and the memory, the one or more processing units configured to configure an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session, receive, from the initiator, the CSR, and schedule information exchange among the plurality of clusters based on the CSR.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
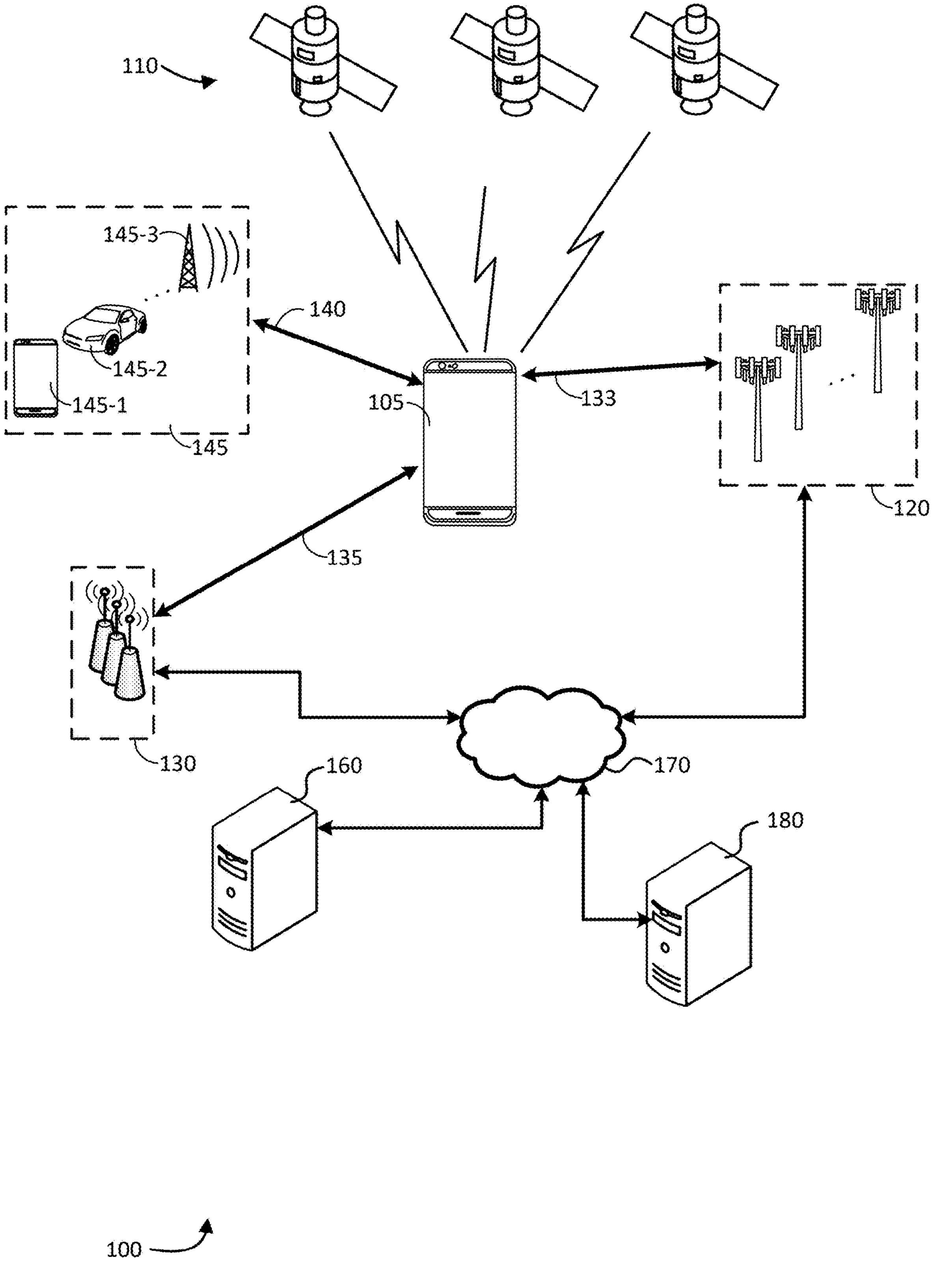
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein (including, for example, UWB-based positioning, cellular-based positioning, and hybrid cellular/UWB positioning) may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, UWB-based positioning offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

As will be disclosed in detail below, when performing a UWB session (also referred as UWB wireless positioning, UWB positioning, UWB session for positioning, or the like) for positioning a target device, a UWB anchor cluster (also referred to herein as "cluster") covering the target device may be used. A cluster may include one or more UWB devices (e.g., UWB anchors) with known locations that can exchange UWB RF signals (e.g., downlink time difference of arrival (TDoA) signals) with the target device for positioning of the target device. When positioning the target device, a common time based may be shared by the UWB anchors (will be disclosed in detail below).

When the target device travels across different clusters, inter/cross-cluster communication may be used for the neighboring clusters to exchange information regarding the UWB wireless positioning (e.g., to share the common time base). In the existing schemes, the neighboring clusters communicate in a time division multiple access (TDMA) fashion (e.g., a cluster has to wait for all the other clusters to finish a round of message transmission before the cluster can transmit another message again) to reduce/avoid RF interference/collisions which is very inefficient.

To address this information exchange inefficiency, the scheme disclosed herein may allow multiple clusters to exchange information (e.g., transmit messages) at a same time (e.g., allow overlapping slots in a control/extended control phase and/or allow overlapping in the ranging rounds) based on frequency reuse (e.g., using a same channel) and/or frequency division multiple access (FDMA) (e.g., using different channels). Therefore, the information exchange efficiency may greatly increase and may thus significantly enhance the accuracy for positioning the target device moving across clusters. FIG. 1 is a simplified illustration of a positioning system 100 in which a mobile device 105, location server 160, and/or other components of the positioning system 100 can use the techniques provided herein for UWB wireless positioning, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include an LTE wireless network, a Fifth Generation (5G) wireless network (also referred to as an NR wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/ L2/ L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a GNSS such as GPS, GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g., to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2A:
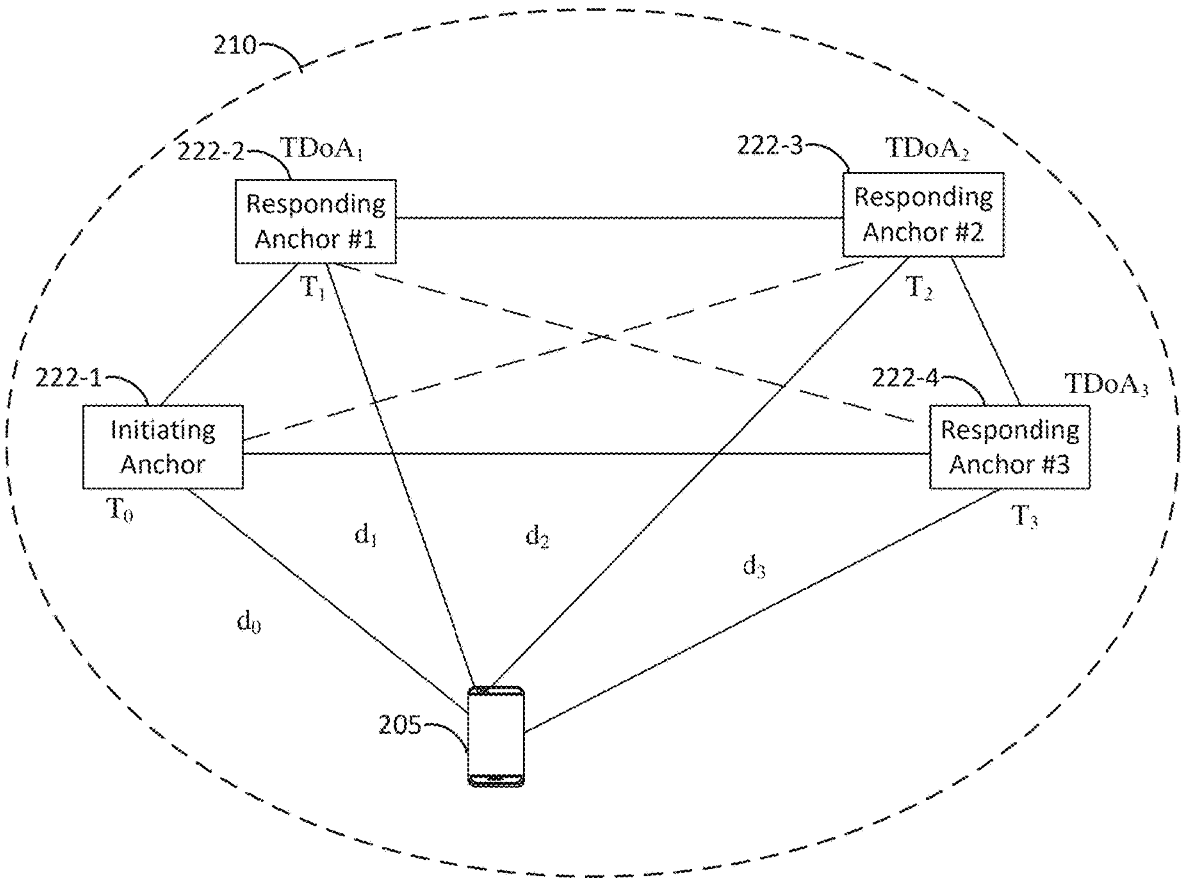
FIG. 2A is a diagram illustrating a scenario in which ultra-wideband (UWB) technologies may be used for positioning a target device.

FIG. 2A is a diagram illustrating a scenario in which UWB technologies may be used for positioning a target device 205 (e.g., a tag). Here, target device 205 may correspond with mobile device 105 of FIG. 1. As illustrated in FIG. 2A, a target device 205 may comprise a wireless communication device within a coverage of a cluster 210. Cluster 210 may include one or more UWB devices (e.g., UWB anchors 222) with known locations that can exchange UWB RF signals (e.g., downlink time difference of arrival (TDoA) signals) with target device 205 for positioning of target device 205. For example, as illustrated in FIG. 2A, UWB anchors 222 may include an initiator 222-1 (e.g., an initiating anchor) and responders 222-2, 222-3, and 222-4 (e.g., responding anchors). The roles of each of the devices (e.g., initiator 222-1 and responders 222-2, 222-3, and 222-4) will be disclosed in detail below. In some embodiments, UWB anchors 222 may be downlink UWB anchors.

When performing positioning/localization of target device 205, target device 205 may send and/or receive UWB RF signals from UWB anchors 222. UWB anchors 222 may use different measurements of the UWB RF signals (e.g., time difference of arrival (TDoA), two-way ranging (TWR), reverse TDoA, and/or phase difference of arrival (PDoA)) to calculate the distance between devices. For example, in a time difference of arrival (TDoA) scheme, target device 205 may send a UWB RF signal (e.g., a "beacon" or a "blink" signal) to each of anchors 222, where each of UWB anchors 222 timestamps the arrival/reception of the UWB RF signal based on a common synchronized time-base. The timestamps from each of UWB anchors 222 may be used for calculating the TDoA for each of the responders (e.g., responders 222-2, 222-3, and 222-4). For example, the TDoA for responders 222-2, $TDoA_1$ (e.g., the time difference between initiator 222-1 and responder 222-2) may be calculated as:

$$TDoA_1 = (d_1 - d_0)/c = T_1 - T_0$$

where $d_0$ and $d_1$ denote the distance between target device 205 and initiator 222-1 and responder 222-2 respectively, c denotes the speed of light, and $T_0$ and $T_1$ denote the timestamps when the UWB RF signal is received by initiator 222-1 and responder 222-2 respectively. The location of target device 205 may be determined based on the TDoAs (e.g., $TDoA_1$, $TDoA_2$, and $TDoA_3$).

Figure 2B:
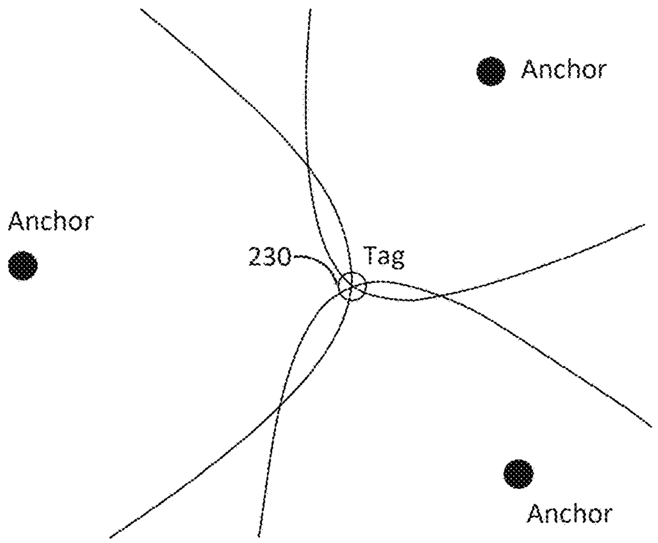
FIG. 2B is a simplified diagram illustrating how UWB positioning of a target device may be performed based on time difference of arrival (TDoA), according to some embodiments.

For example, FIG. 2B is a simplified diagram illustrating how positioning of target device 205 may be performed based on the TDoAs, according to some embodiments. Here, the time difference between the arrival of the UWB RF signal in two anchors (e.g., $TDoA_1$, $TDoA_2$, $TDoA_3$, in FIG. 2A) can be used to calculate hyperbola(s) as illustrated in FIG. 2B. Using multilateration, the location of target device 205 may be determined as the location in which (e.g., circle 230) all the hyperbolas intersect. The result may be a 2D or 3D position for target device 205.

Figure 3A:
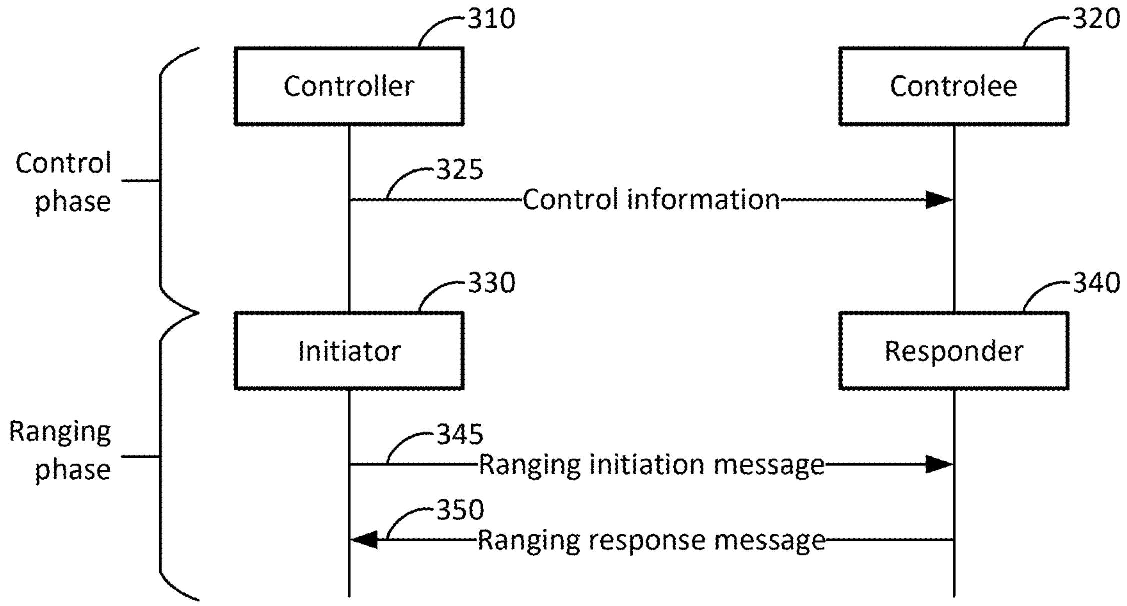
FIGS. 3A and 3B are flow diagrams illustrating the roles different devices may assume with regard to a UWB ranging session.

FIG. 3A is a flow diagram illustrating the roles different devices may assume with regard to a UWB ranging session (or simply a "UWB session"). Here, each UWB device may be referred to as an enhanced ranging device (ERDEV). ERDEVs may be referred to different terminologies (e.g., initiator/responder or controller/controlee) at different layers of the network stack. The terms initiator and responder (described above and hereafter) would be used at lower layers (e.g., at UWB physical (PHY) and media access control (MAC) layers), while the terms controller and controlee (also described hereafter) may be used at higher layers (e.g., an application layer of the ERDEVs). Here, either ERDEV may correspond with a target device 205 or UWB anchors 222 of FIG. 2A, or mobile device 105 of FIG. 1.

As indicated, for a pair of ERDEVs communicating with each other, the controller 310 is an ERDEV that sends control information message 325 to a receiving ERDEV, designated as controlee 320. Control information message 325 may include parameters for the ranging phase of the UWB ranging session, such as timing, channel, etc. Although not illustrated, controlee 320 can send acknowledgment to control information message 325, may negotiate changes to the parameters, and/or the like.

The exchange between controller 310 and controlee 320, including the sending of control information message 325 and subsequent related exchanges between controller 310 and controlee 320 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round. Accordingly, some aspects of the control phase may be considered to occur in band, subsequent to the preliminary OOB exchange between controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, initiator 330 may initiate UWB ranging by sending a ranging initiation message 345 to responder 340, to which the responder 340 may reply with a ranging response message 350, and timing measurements may be made of these messages (by the devices receiving the messages) to perform the time difference of arrival (TDoA). Depending on the parameters of control information message 325, additional exchanges may be made in the ranging phase between initiator 330 and responder 340 to allow for additional ranging measurements.

Figure 3B:
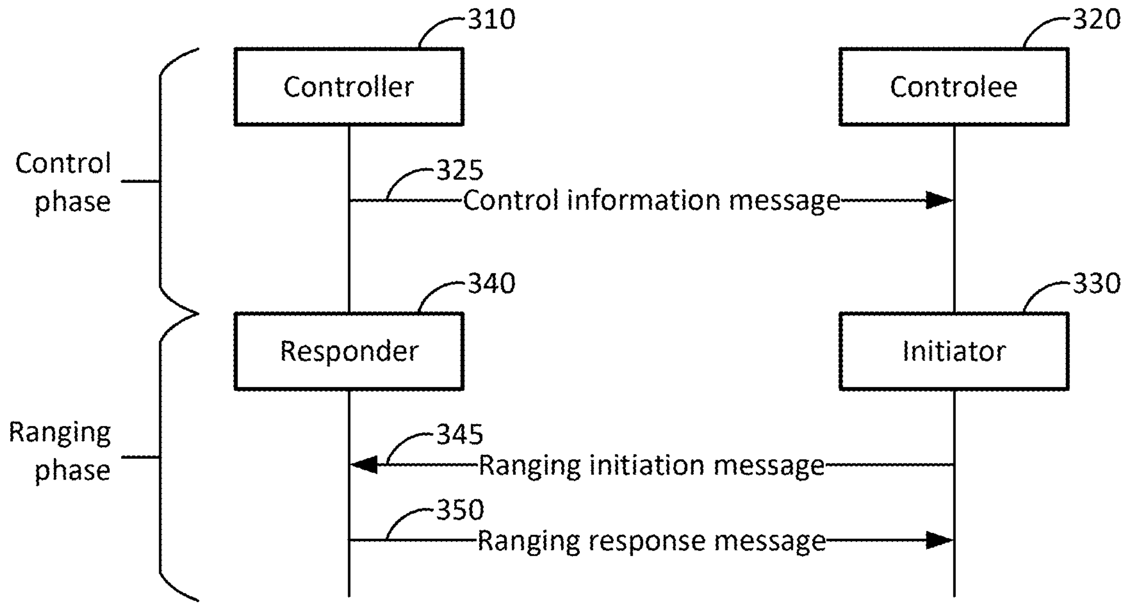

The roles of initiator 330 and responder 340 may be indicated in control information message 325. Further, as indicated in FIG. 3A, controller 310 in the control phase may be initiator 330 in the ranging phase of the UWB session. Alternatively, as indicated in FIG. 3B, controller 310 in the control phase may be responder 340 in the ranging phase. The determination of which device is initiator 330 and which is responder 340 may depend on the parameters set forth in control information 325, in which case controlee 320 correspondingly becomes either responder 340 or initiator 330. According to some embodiments, a controller/initiator may conduct ranging with multiple controlees/responders.

Figure 4:
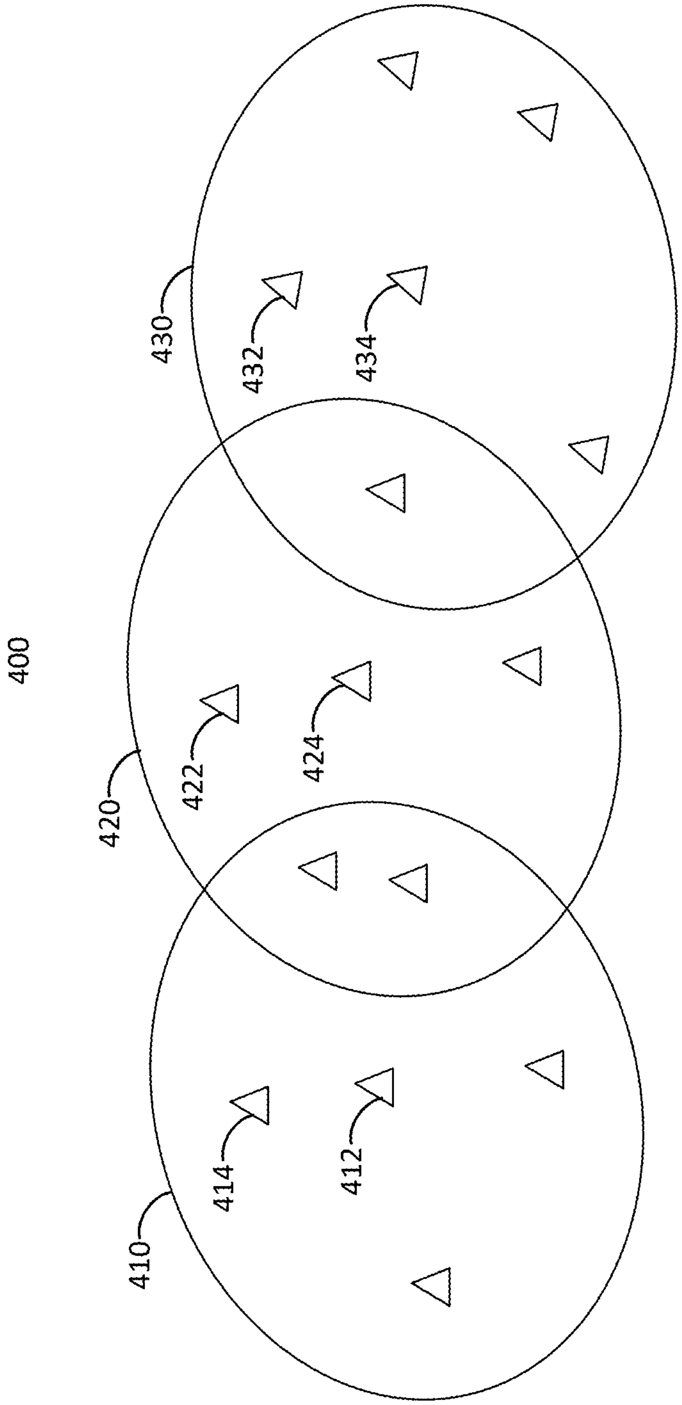
FIG. 4 is a diagram illustrating an example multi-cluster deployment and associated terminology.

When performing the UWB session for positioning target devices that travel across different clusters, inter/cross-cluster communication may be used for the neighboring clusters to share a common time base (e.g., to synchronize). In some embodiments, the clusters may establish a multi-cluster deployment where all the clusters within the deployment shares a same synchronization reference. FIG. 4 is a diagram illustrating an example multi-cluster deployment. As illustrated in FIG. 4, clusters 410, 420, and 430 form a multi-cluster deployment 400 for performing UWB sessions for positioning target devices within the coverage of multi-cluster deployment 400.

According to some embodiments, the synchronization may be initiated by an anchor within multi-cluster deployment 400 (e.g., initiator 412 of cluster 410). For example, using a cost metric, the synchronization may be performed using a synchronization hierarchy where the cost metric corresponds to a degree of proximity to the anchor that provides the common time base (e.g., the synchronization reference). In some embodiments, the cost metric may be communicated in either a ranging initiation message or a ranging response message as disclosed along with the description in FIGS. 3A and 3B.

According to some embodiments, the synchronization may also be initiated by a super-PAN coordinator (e.g., an inter-cluster controller) that coordinates message transmission between the clusters. Inter-cluster controller is also referred to herein as a super-PAN controller, logical controller, centralized logical controller, controller of a plurality of clusters, or the like. For example, as illustrated in FIG. 4, a super-PAN coordinator 424 may transmit a time reference to each coordinator of the cluster (e.g., coordinators 414 and 434) to perform the synchronization cross the clusters. The time reference may be transmitted in a superframe structure where the message includes a beacon-only period, a contention free period (CFP), and a contention access period (CAP). The beacon-only period may include a series of time slots reserved for communication between the coordinators of the clusters. It is contemplated that, although in FIGS. 7 and 8 along with the descriptions illustrate that each ranging round includes an extended ranging control phase, in some embodiments, only one ranging round (e.g., the initial ranging round) may include the extended ranging control phase for all the controller-anchor (also referred as the "controller".) For ease of illustration, those embodiments will not be repeated.

It should be noted that FIG. 4 provides only a generalized illustration of various components of multi-cluster deployment 400, any or all of which may be utilized as appropriate, and each of which may be duplicated as necessary. Specifically, although initiator 412 and coordinator 414 are shown as different UWB devices in cluster 410, it will be understood that both initiator 412 and coordinator 414 can be a same UWB device in cluster 410. Also, in absence of a centralized logical controller that coordinates message transmission between the clusters (e.g., super-PAN coordinator 424), at least one of the initiators (e.g., initiators 412, 422, and 432) may assume the role and may communicate with the other initiators/coordinators of different clusters for coordinating message transmission and/or cross-cluster synchronization.

According to existing UWB session schemes, after the synchronization, the clusters in a same multi-cluster deployment (e.g., clusters 410, 420, and 430) will be scheduled to operate over a common channel but on different ranging rounds (will be disclosed in detail below) to avoid interferences/collisions. For example, clusters 410, 420, and 430 may communicate (e.g., transmit messages) in a time division multiple access (TDMA) fashion according to the arrangement/scheduling determined by the controller.

Figure 5:
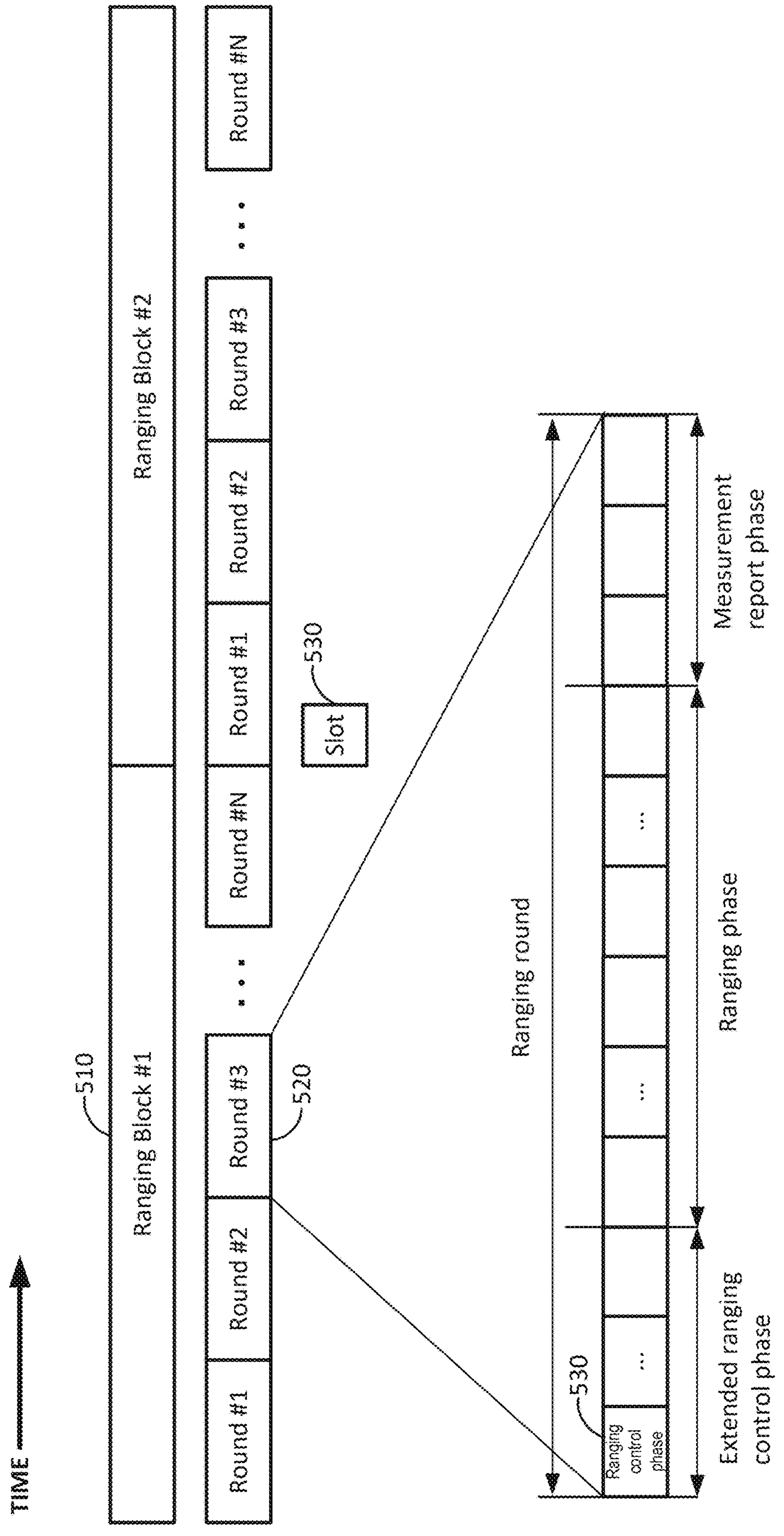
FIG. 5 is a diagram showing an example of a frame structure for a UWB session and associated terminology.

FIG. 5 is a diagram showing an example of a frame structure for a UWB session and associated terminology. The timing in a UWB session may occur over a period of time divided into sub-portions according to a hierarchical structure. Similar to a TDMA scheme, the UWB session defines timing during which ranging can occur. This timing comprises one or more consecutive ranging blocks 510, which may have a configurable duration (e.g., 200 ms). Each ranging block 510 may be split into one or more successive rounds 520 (e.g., N rounds), the number and length of which are configurable. As noted above, each round may be assigned/arranged to a cluster (e.g., clusters 410, 420, or 430 in FIG. 4) for message transmission. In some embodiments, the arrangement may be identified in the control information using its corresponding round index (e.g., Round #3).

Rounds 520 are further split into different slots 530, which also have a configurable number and length. For example, slots 530 in rounds 520 may be scheduled into a ranging control phase (e.g., a signal slot) or an extended ranging control phrase, a ranging phase, and a measurement report phase, where the length/number of slots 530 in each phase is configurable. For example, the extended ranging control phase may include one or more slots 530 corresponding to the controllers of the cluster which round 520 is assigned to (e.g., M slots in the extended control phase corresponds to M controllers of the cluster).

According to existing schemes as disclosed above, to reduce/avoid RF interference/collisions for communication cross clusters, each ranging round 520 in ranging block 510 may be assigned to a cluster (e.g., one of clusters 410, 420, or 430 in FIG. 4) for UWB devices within the cluster to perform UWB sessions. Accordingly, a first cluster has to wait for all the other clusters to finish a round of UWB message transmission (e.g., finish the ranging round assigned to that cluster) before the first cluster can transmit message again which is very inefficient. To address this information exchange inefficiency, the scheme disclosed herein may allow multiple clusters to exchange information (e.g., transmit messages) at a same time (e.g., allow overlapping slots in a control/extended control phase and/or allow overlapping in the ranging rounds) based on frequency reuse (e.g., using a same channel) and/or frequency division multiple access (FDMA) (e.g., using different channels). Therefore, the information exchange efficiency may greatly increase and may thus significantly enhance the accuracy for positioning the target device moving across clusters.

Figure 6:
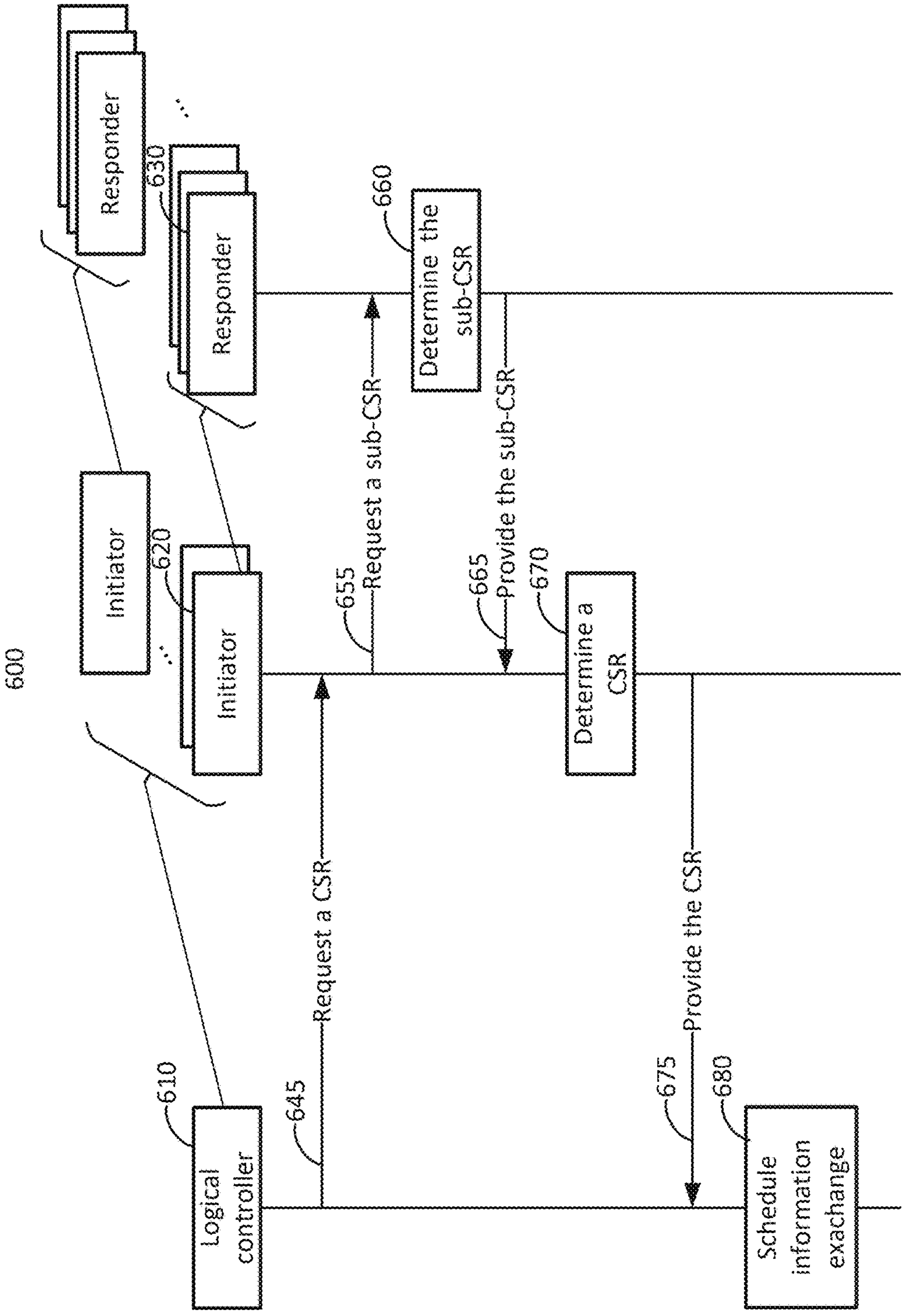
FIG. 6 is a flow diagram illustrating how a controller may configure an initiator to optimize information exchange in a UWB session, according to some embodiments.

FIG. 6 is a flow diagram illustrating how a controller may configure an initiator to optimize information exchange in a UWB session, according to some embodiments. Here a logical controller 610 may be a centralized logical controller (e.g., a server) or a super-PAN coordinator that coordinates message transmission among a multi-cluster deployment 600. In some embodiments, multi-cluster deployment 600 may correspond with multi-cluster deployment 400 in FIG. 4. Multi-cluster deployment 600 may include multiple initiators 620. In some embodiments, initiators 620 may correspond with initiator 222-1 in FIG. 2A, and/or initiators 412, 422, or 432 in FIG. 4. In some embodiments, in absence of a centralized logical controller, one of initiators 620 may assume the role of the centralized logical controller (e.g., performing the function of logical controller 610 and becoming a "global anchor") to coordinate communications among initiators 620 in multi-cluster deployment 600.

Besides initiator 620, each cluster may also include one or more responders 630 as noted above. Initiators 620 and responders 630 may correspond with UWB anchors 222 in FIGS. 2A and 2B, and the role assumed by initiators 620 and responders 630 may correspond with the role assumed by initiators 330 and responders 340 in FIG. 3. In some embodiments, the communication between logical controller 610 and initiators 620 may be conducted OOB using a different wireless communication than UWB (e.g., using Bluetooth, Ethernet, etc.). As noted above, the communication between logical controller 610 and initiators 620 may include the control information that includes relevant parameters for performing a UWB session between the UWB device(s) (e.g., logical controller 610, initiators 620, and/or responders 630).

As illustrated in FIG. 6, starting from arrow 645, logical controller 610 may transmit a request configuring one or more initiators 620 to determine a channel scan report (CSR) for the clusters initiators 620 belong to. In some embodiments, the CSR is generated based on an interference profile of the cluster, indicating interferences in a wireless positioning (e.g., the UWB session) performed by the cluster, that are caused by information exchange among multi-cluster deployment 600 (e.g., cross-cluster communication within multi-cluster deployment 600). For example, a cluster of a multi-cluster deployment may use certain channel (e.g., having a predetermined bandwidth and a predetermined central frequency) for communication (e.g., transmit messages between the initiators and the responders of the cluster, cross clusters, and/or with the logical controller of the multi-cluster deployment). The channel used by the cluster may be the same, overlap, and/or be close in frequency to a channel used by another cluster of the multi-cluster deployment for performing message transmission in a UWB session. As a result, interferences in the channel may happen. In some embodiments, the interferences may be indicated in the CSR of the cluster.

Figure 7:
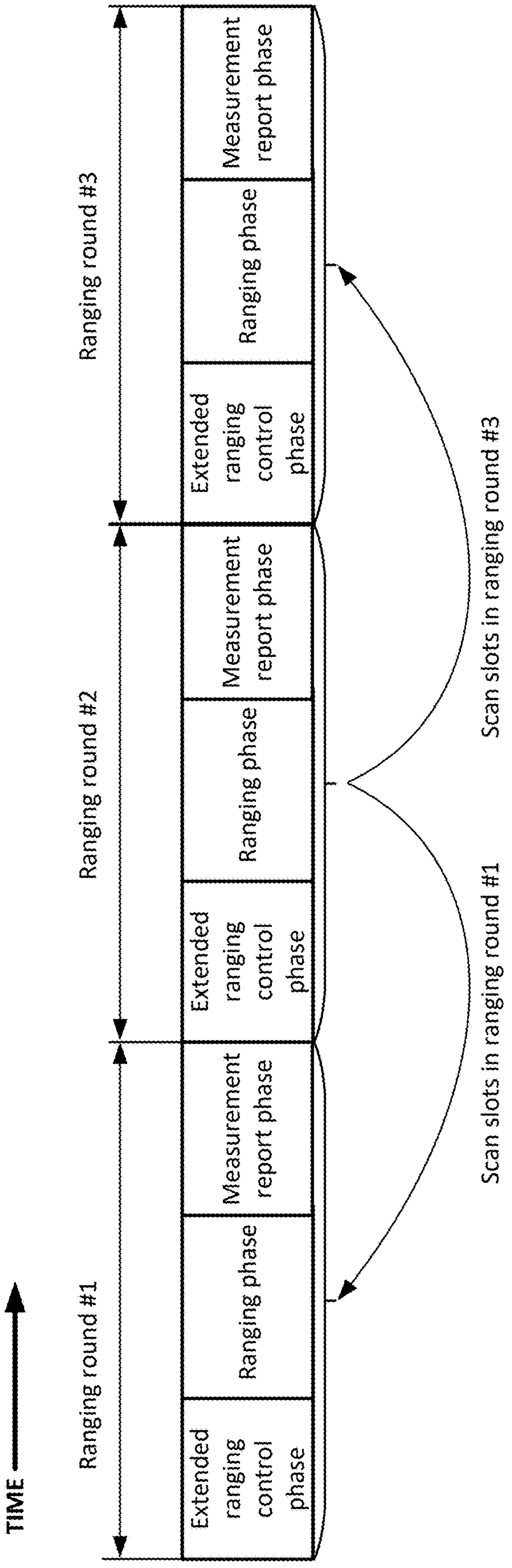
FIG. 7 is a diagram showing an example of generating a channel scan report (CSR) based on scans of a ranging block, according to some embodiments.

After receiving the request, the specific initiator 620 may determine the CSR based on one or more RF scans performed during a ranging block performed within multi-cluster deployment 600 in a UWB positioning session. FIG. 7 is a diagram showing an example of generating a CSR based on scanning of a ranging block, according to some embodiments. For example, referring back to FIG. 6, at arrow 655, the specific initiator 620 may transmit a request to one or more responders 630 of the cluster that the specific initiator 620 belongs to for sub-CSR(s). The sub-CSR may indicate the interferences to the message transmission of the one or more responders 630 that are caused by information exchange of other clusters of multi-cluster deployment 600. In some embodiments, each and every responder of the cluster may receive the request for the sub-CSR, perform the RF scans, and determine its own sub-CSR accordingly.

At block 660, responders 630 may determine the sub-CWB based on scan(s) of ranging round(s) of the ranging block that are assigned to other clusters of multi-cluster deployment 600. For example, as illustrated in FIG. 7, responders 630 may belong to a cluster to which ranging round #2 is assigned. In some embodiments, each of responders 630 may RF scan slots (e.g., scan the frequency/channel taken by the slot) in other ranging rounds assigned to other clusters of a current UWB session (e.g., ranging rounds #1 and #3 transmitting, where UWB messages originated by the other clusters were transmitted) for determining the sub-CSR. For example, responders 630 may RF scan one, more or all of the slots in other ranging rounds assigned to other clusters for determining the interferences.

In some embodiments, when scanning the slots, responders 630 may conduct the RF scan according to a predetermined/prescribed list of channels (e.g., a channel mapping for scan, specifying the channels to be scanned), scheduled/determined by logical controller 610. In some embodiments, logical controller 610 may also schedule/allocate specific ranging slots to initiators 620 for transmitting "beacons" that are intended to be measured/scanned for determining the CSR. The specific scan fashions are not limited and may depend on desired functionality. In some embodiments, responders 630 may indicate/include the determination of the scan in the sub-CSR.

Referring back to arrow 665, each of responders 630 may provide the determined sub-CSR to initiators 620 of the cluster. For example, responders 630 may transmit the sub-CSR to the corresponding initiator in the ranging round assigned to the cluster (e.g., during a ranging phase of the ranging round). At block 670, each of initiators 620 may determine the CSR for the cluster based on the sub-CSRs received from the corresponding responders 630. As noted above, the CSR may indicate interferences to the cluster for performing the UWB session, caused by information exchange among multi-cluster deployment 600. In some embodiments, the interferences may be determined based on one or more of clear channel assessment (CCA) modes according to IEEE 802.15.4 standard. For example, the interference may be determined using UWB preamble sense based on the synchronization header (SHR) of a frame (e.g., the ranging rounds/slots) and/or using UWB preamble sense based on the packet with the multiplexed preamble (e.g., TDMA type multiplexed preamble).

In some embodiments, the CSR may indicate any interferences determined by initiators 620 and/or responders 630. Or, in some other embodiments, the CSR may only indicate interferences that are above a predetermined threshold of detected signal strength (e.g., the level of the interference meets a certain threshold). In some embodiments, after the interferences have been determined, a signal to interference & noise ratio (SINR) value for the corresponding channel and slot may also be determined. In some embodiments, the SINR value for the corresponding channel and slot may be included in the CSR for indicating the interference profile of the cluster.

At arrow 675, initiators 620 may provide the CSR to logical controller 610 for scheduling the information exchange among multi-cluster deployment 600. At block 680, logical controller 610 may schedule the information exchange among multi-cluster deployment 600 (e.g., scheduling/allocating in a next ranging block, the ranging rounds and/or ranging slots) based on the CSRs.

Figure 8:
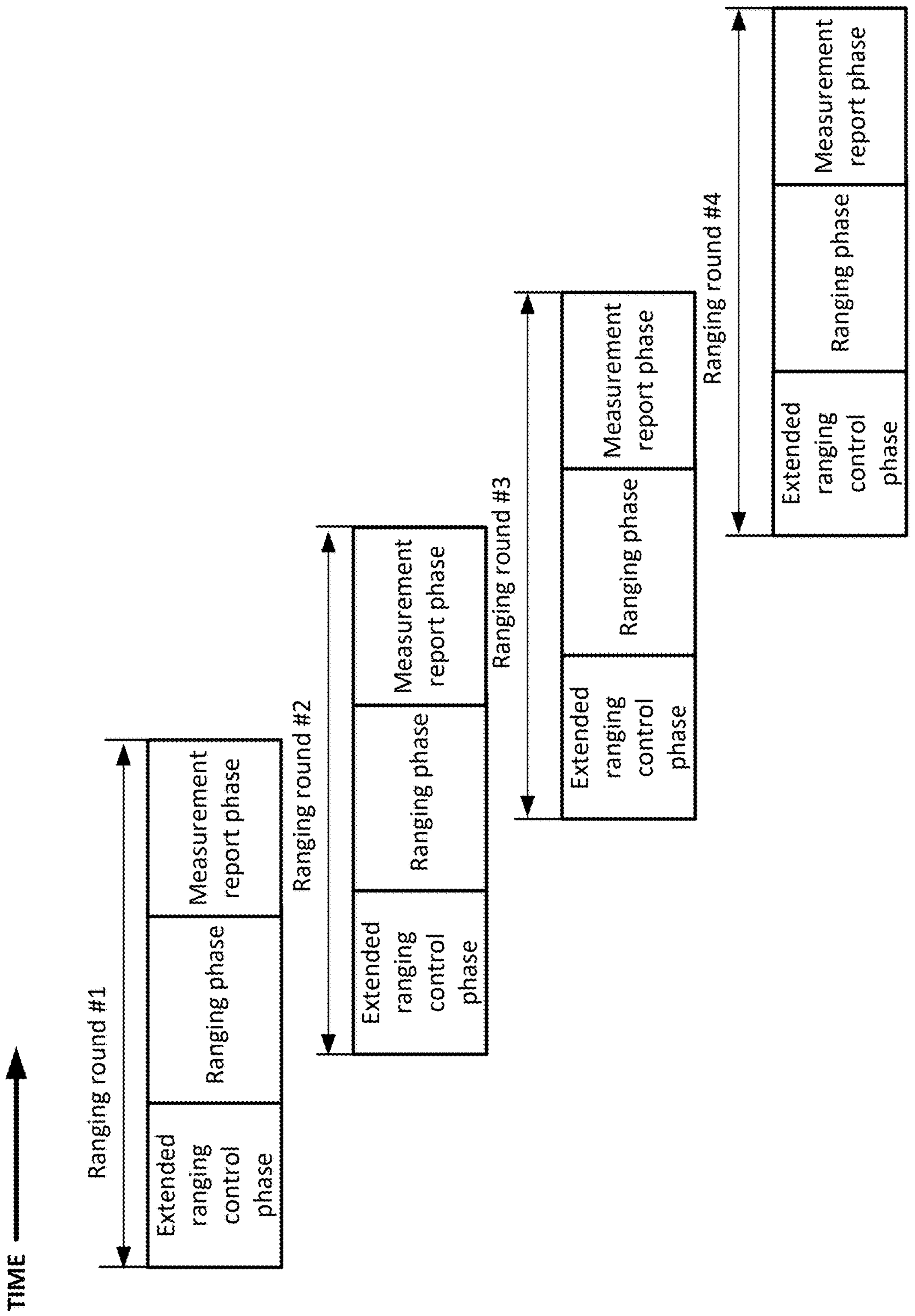
FIG. 8 is a diagram showing an example of scheduling information exchange among the plurality of anchor clusters based on the CSR, according to some embodiments.
Figure 9:
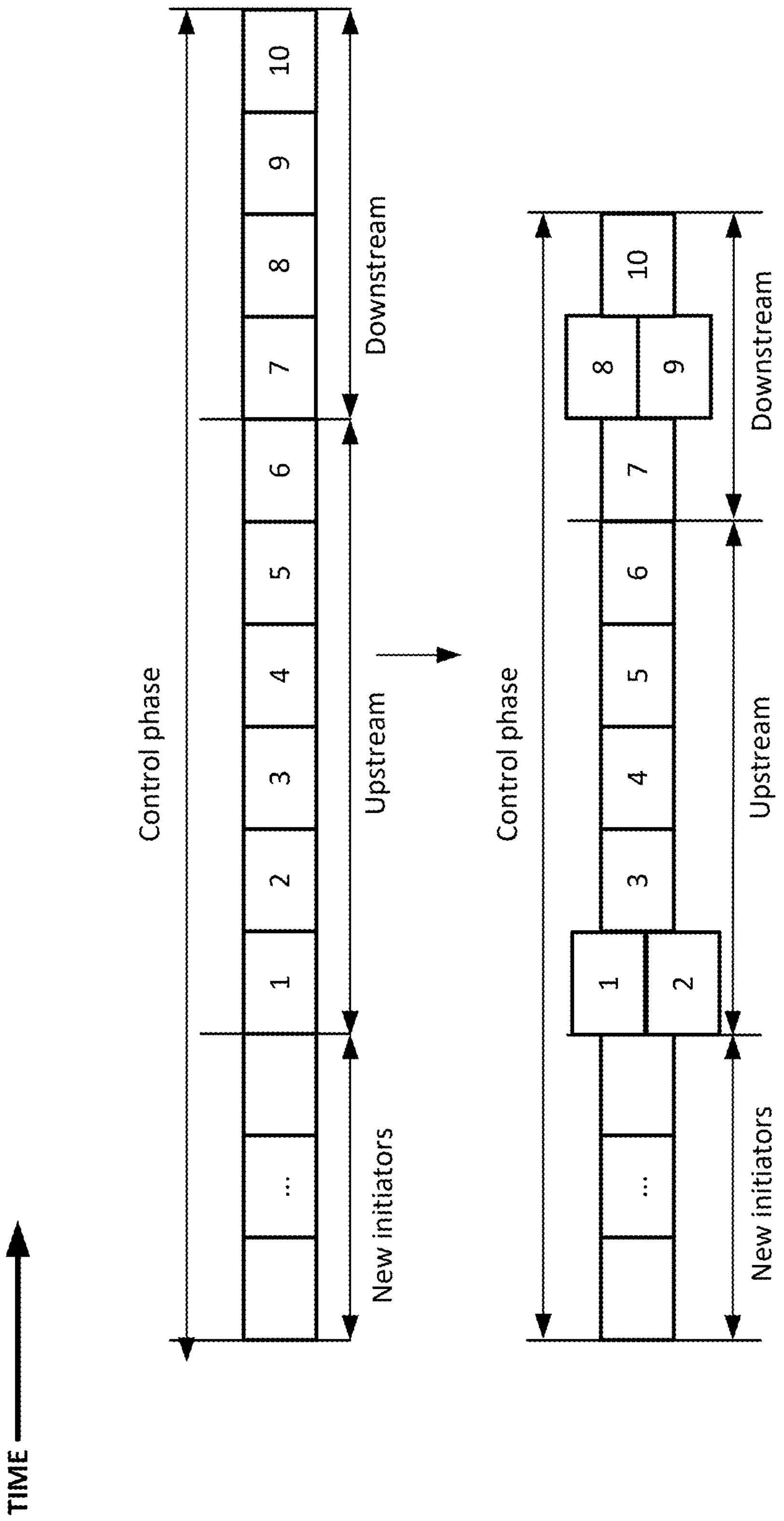
FIG. 9 is a diagram showing an example of scheduling information exchange among the plurality of anchor clusters based on the CSR, according to some embodiments.

FIGS. 8 and 9 are diagrams showing examples of scheduling information exchange among multi-cluster deployment 600 based on the CSR, according to some embodiments. In some embodiments, based on the one or more CSRs received from initiators 620, in the next ranging block, logical controller 610 may schedule at least a portion of the ranging rounds assigned to different clusters to overlap in time. For example, as illustrated in FIG. 8, logical controller 610 may overlap in time at least a portion of ranging rounds #1 with #2, #2 with #3, #3 with #4, or any of the combination thereof. For example, based on the CSRs indicating the interference profiles of each cluster (e.g., indicating interferences on the specified channel), logical controller 610 may schedule the communication on different clusters such that at some time point(s), different clusters may communicate simultaneously using a same or different channels. For example, logical controller 610 may schedule the ranging rounds based on FDMA, where different clusters may use different channels to transmit messages simultaneously. For another example, logical controller 610 may also schedule the ranging rounds based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level of detected signal strength.

In some embodiments, based on the one or more CSRs received from initiators 620, in the next ranging block, logical controller 610 may also schedule at least a portion of the ranging slots in a control phase (e.g., beacon-only period in the superframe structure) assigned to different clusters to overlap in time. For example, as illustrated in FIG. 9, logical controller 610 may overlap a portion of ranging lots 1 with 2, and/or 8 with 9. For example, based on the CSRs indicating the interference profiles of the clusters (e.g., on specified channels), logical controller 610 may schedule the information relay on different clusters such that at some time point(s), different clusters may pass on information simultaneously using different channels. For example, the logical controller 610 may schedule the ranging rounds based on FDMA, where different clusters may use different channels to transmit messages. For another example, the logical controller 610 may also schedule the ranging slots in the control phase based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level of detected signal strength.

Accordingly, information/messages can be exchanged/transmitted simultaneously among different clusters (e.g., overlapping in time different ranging rounds and/or ranging slots) in the UWB sessions and thus may significantly increase the communication efficiency of the UWB session performed by the multi-cluster deployment. This could in turn increase the accuracy of the UWB positioning of a target device that travels cross clusters.

Figure 10A:
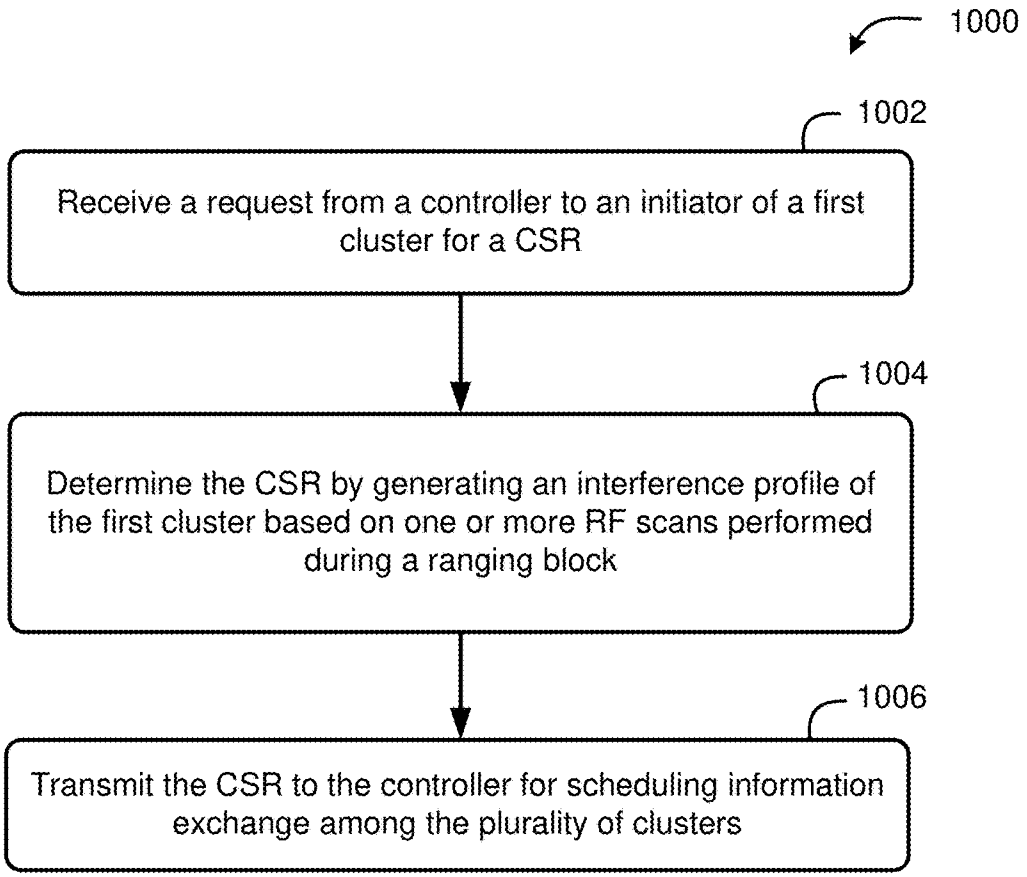
FIGS. 10A and B are flow diagrams of a method of cross-cluster coordination in UWB wireless positioning, according to an embodiment.
Figure 11:
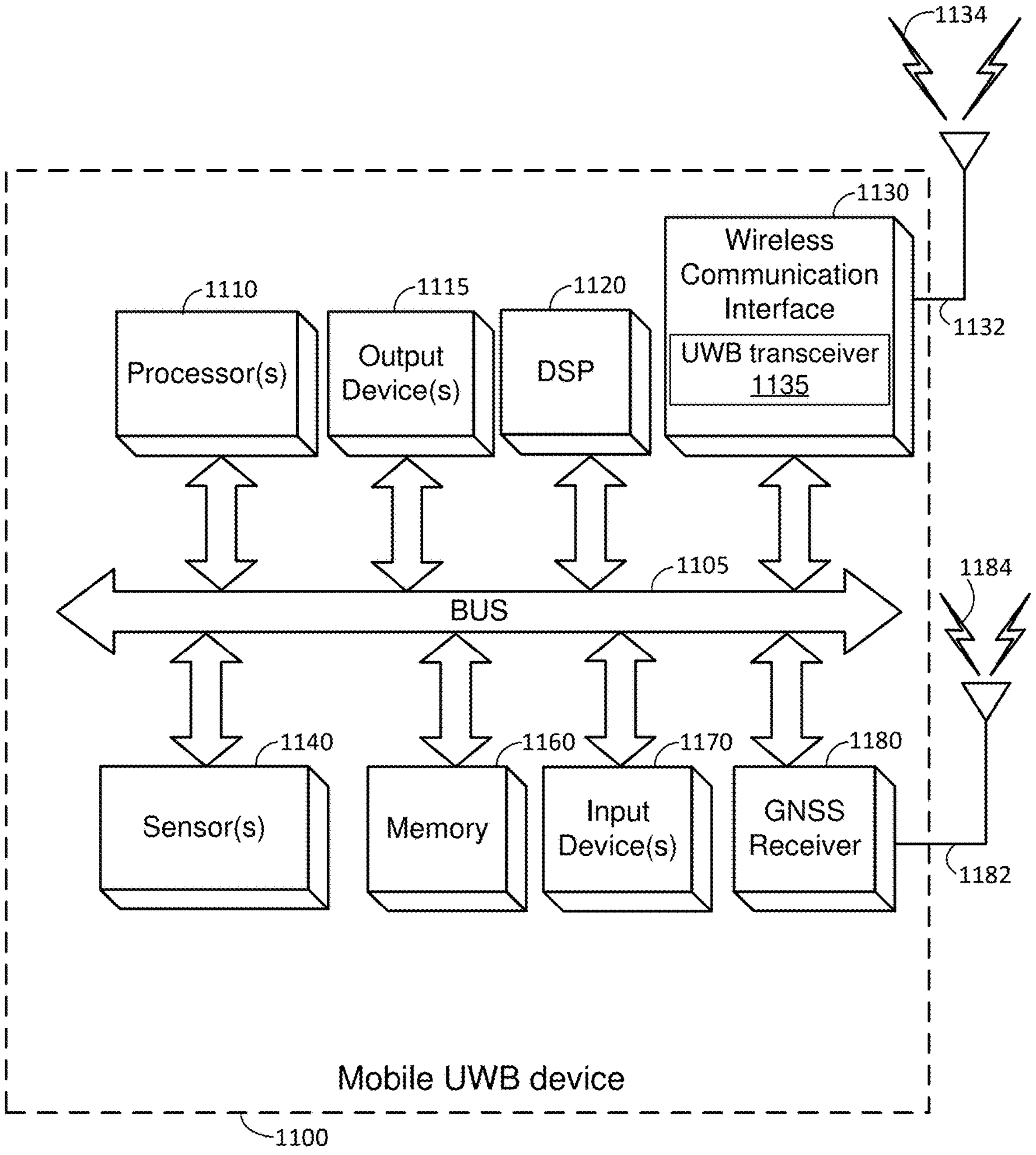
FIG. 11 is a block diagram of an embodiment of a mobile UWB device, according to an embodiment.
Figure 12:
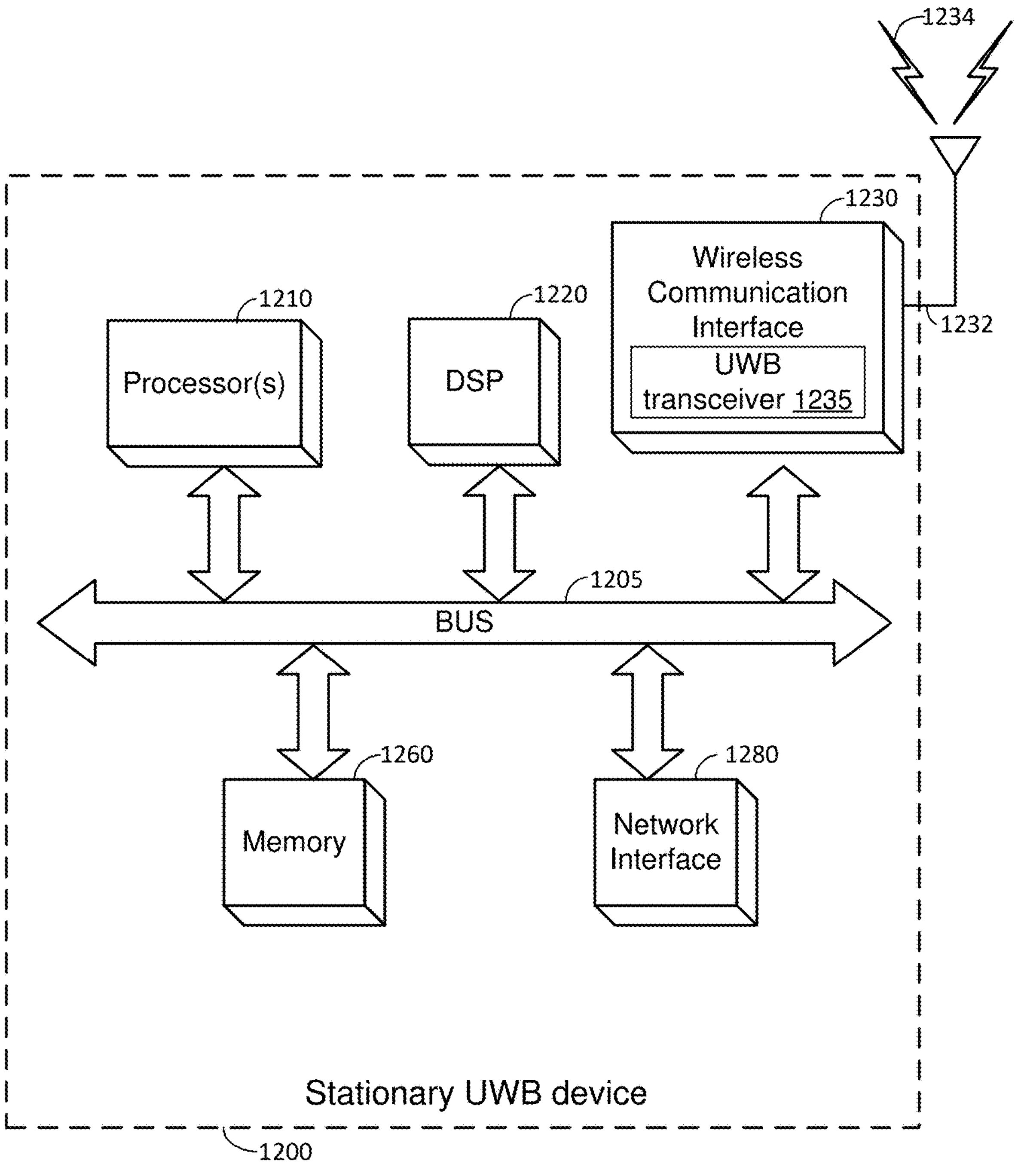
FIG. 12 is a block diagram of an embodiment of a stationary UWB device, according to an embodiment.

FIG. 10A is a flow diagram of a method 1000 of cross-cluster coordination in UWB wireless positioning performed by an initiator (e.g., initiators 620 in FIG. 6) of a first cluster, according to an embodiment. Means for performing the functionality illustrated in one or more of the blocks shown in FIG. 10A may be performed by hardware and/or software components of a UWB device. Example components of UWB devices are illustrated in FIGS. 11 and 12 which are described in more detail below.

At block 1002, the functionality includes receiving, from a controller (e.g., logical controller 610 in FIG. 6) of a plurality of clusters (e.g., multi-cluster deployment 600 in FIG. 6) that includes the first cluster, a request for a channel scan report (CSR) indicating interferences in a wireless positioning performed by the first cluster, wherein the interferences are caused by information exchange among the plurality of clusters. As noted, according to some embodiments, the CSR may be generated based on an interference profile of the first cluster, indicating interferences in a wireless positioning (e.g., the UWB session) performed by the first cluster that are caused by information exchange among the multi-cluster deployment (e.g., cross-cluster communication within the multi-cluster deployment). Accordingly, the interferences may be indicated in the CSR of the first cluster. Means for performing functionality at block 1002 may comprise a bus 1105, processor(s) 1110, memory 1160, wireless communication interface 1130 (including optional UWB transceiver 1135), and/or other components of a mobile UWB device 1100 as illustrated in FIG. 11 and described hereafter.

The functionality at block 1004 includes determining the CSR by generating an interference profile of the first cluster based on one or more RF scans performed during a ranging block performed by the multi-cluster deployment in a UWB positioning session. As noted above, upon receiving the request, the initiator may transmit a request to one or more of the responders (e.g., responders 630 in FIG. 6) of the first cluster for a sub-CSR indicating the interferences to the message transmission of the one or more of responders which are caused by information exchange among the multi-cluster deployment.

In some embodiments, each and every responder of the first cluster may receive the request and may determine its own sub-CSR accordingly. For example, each of the responder may determine the sub-CWB based on scan(s) of ranging round(s) of the ranging block assigned to other clusters of the multi-cluster deployment as illustrated along with the corresponding description in FIG. 7. After the determination, the responder may indicate/include the determination of the scan in the sub-CSR. The responder may then transmit the sub-CSR back to the initiator for determining the CSR of the first cluster. For example, the responder may transmit the sub-CSR to the corresponding initiator in the ranging round assigned to the first cluster (e.g., during a ranging phase of the ranging round).

In some embodiments, the initiator may determine the CSR for the cluster based on the sub-CSRs received from the corresponding responders. As noted above, the CSR may indicate interferences to the cluster for performing the UWB session, caused by information exchange among the multi-cluster deployment. In some embodiments, the interferences may be determined based on one or more of clear channel assessment (CCA) modes according to IEEE 802.15.4 standard. For example, the interference may be determined using UWB preamble sense based on the synchronization header (SHR) of a frame (e.g., the ranging rounds/slots) and/or using UWB preamble sense based on the packet with the multiplexed preamble (e.g., TDMA type multiplexed preamble). Means for performing functionality at block 1004 may comprise a bus 1105, processor(s) 1110, memory 1160, wireless communication interface 1130 (including optional UWB transceiver 1135), and/or other components of a mobile UWB device 1100 as illustrated in FIG. 11 and described hereafter.

The functionality at block 1006 includes transmitting, the CSR to the controller (e.g., logical controller 610 in FIG. 6) for scheduling information exchange among the plurality of anchor cluster. In some embodiments, the CSR may indicate any interferences determined by the initiator and/or the responder. Or, in some other embodiments, the CSR may only indicate interferences that are above a predetermined threshold of detected signal strength (e.g., the level of the interference meets a certain threshold). In some embodiments, after the interferences have been determined, a signal to interference & noise ratio (SINR) value for the corresponding channel and slot may also be determined and may be included in the CSR for indicating the interference profile of the cluster. Means for performing functionality at block 1006 may comprise a bus 1105, processor(s) 1110, memory 1160, wireless communication interface 1130 (including optional UWB transceiver 1135), and/or other components of a mobile UWB device 1100 as illustrated in FIG. 11 and described hereafter.

In some embodiments, the information exchange among the multi-cluster deployment may be scheduled based on the CSRs by the logical controller. As noted, according to some embodiments, based on the one or more CSRs received by the logical controller (e.g., logical controller 610 in FIG. 6), in the next ranging block, the logical controller may schedule at least a portion of the ranging rounds assigned to different clusters to overlap in time. For example, as illustrated in FIG. 8, the logical controller may overlap at least a portion of ranging rounds #1 with #2, #2 with #3, #3 with #4, or any of the combination thereof. For example, based on the CSRs indicating the interference profiles (e.g., indicating interferences on the specified channel) of each cluster, the logical controller may schedule the communication on different clusters such that at some time point(s), different clusters may communicate simultaneously using a same or different channels. In some embodiments, the logical controller may schedule the ranging rounds based on FDMA, where different clusters may use different channels to transmit messages simultaneously. In some embodiments, the logical controller may also schedule the ranging rounds based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level of detected signal strength.

In some embodiments, based on the one or more CSRs received by the logical controller, in the next ranging block, the logical controller may also schedule at least a portion of the ranging slots in a control phase (e.g., beacon-only period in the superframe structure) assigned to different clusters to overlap in time. For example, as illustrated in FIG. 9, the logical controller may overlap a portion of ranging lots 1 with 2, and/or 8 with 9. For example, based on the CSRs indicating the interference profiles of the clusters (e.g., on specified channels), the logical controller may schedule the information relay on different clusters such that at some time point(s), different clusters may pass on information simultaneously using different channels. In some embodiments, the logical controller may schedule the ranging rounds based on FDMA, where different clusters may use different channels to transmit messages. In some embodiments, the logical controller may also schedule the ranging slots in the control phase based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level of detected signal strength.

Figure 10B:
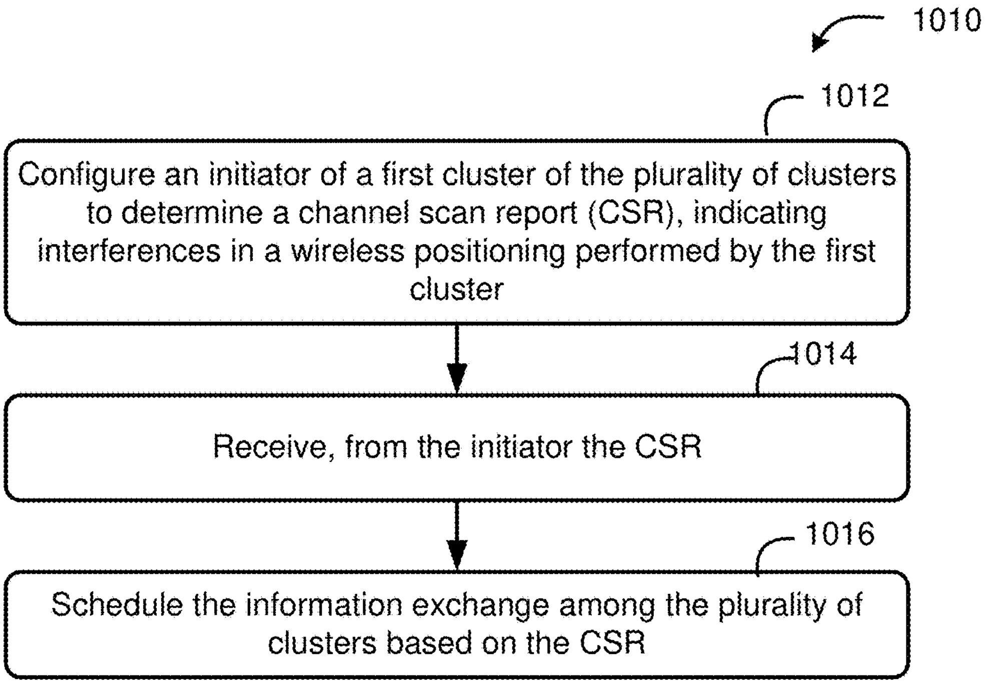

FIG. 10B is a flow diagram of a method 1010 of cross-cluster coordination in UWB wireless positioning performed by a controller (e.g., logical controller 610 in FIG. 6) of a plurality of clusters (e.g., multi-cluster deployment 600 in FIG. 6), according to an embodiment. Means for performing the functionality illustrated in one or more of the blocks shown in FIG. 10B may be performed by hardware and/or software components of a UWB device. Example components of UWB devices are illustrated in FIGS. 11 and 12 which are described in more detail below.

At block 1012, the functionality includes configuring an initiator (e.g., initiators 620 in FIG. 6) of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session. As noted, according to some embodiments, the CSR may be generated based on an interference profile of the first cluster, indicating interferences in a wireless positioning (e.g., the UWB session) performed by the first cluster that are caused by information exchange among the multi-cluster deployment (e.g., cross-cluster communication within the multi-cluster deployment). Accordingly, the interferences may be indicated in the CSR of the first cluster. Means for performing functionality at block 1012 may comprise a bus 1205, processor(s) 1210, memory 1260, wireless communication interface 1230 (including optional UWB transceiver 1235), and/or other components of a stationary UWB device 1200 as illustrated in FIG. 12 and described hereafter.

In some embodiments, upon receiving the request, the initiator may transmit a request to one or more of the responders (e.g., responders 630 in FIG. 6) of the first cluster for a sub-CSR indicating the interferences to the message transmission of the one or more of responders which are caused by information exchange among the multi-cluster deployment. In some embodiments, each and every responder of the first cluster may receive the request and may determine its own sub-CSR accordingly. For example, each of the responder may determine the sub-CWB based on scan(s) of ranging round(s) of the ranging block assigned to other clusters of the multi-cluster deployment as illustrated along with the corresponding description in FIG. 7. After the determination, the responder may indicate/include the determination of the scan in the sub-CSR. The responder may then transmit the sub-CSR back to the initiator for determining the CSR of the first cluster. For example, the responder may transmit the sub-CSR to the corresponding initiator in the ranging round assigned to the first cluster (e.g., during a ranging phase of the ranging round).

In some embodiments, the initiator may determine the CSR for the cluster based on the sub-CSRs received from the corresponding responders. As noted above, the CSR may indicate interferences to the cluster for performing the UWB session, caused by information exchange among the multi-cluster deployment. In some embodiments, the interferences may be determined based on one or more of clear channel assessment (CCA) modes according to IEEE 802.15.4 standard. For example, the interference may be determined using UWB preamble sense based on the synchronization header (SHR) of a frame (e.g., the ranging rounds/slots) and/or using UWB preamble sense based on the packet with the multiplexed preamble (e.g., TDMA type multiplexed preamble). Means for performing functionality at block 1012 may comprise a bus 1105, processor(s) 1110, memory 1160, wireless communication interface 1130 (including optional UWB transceiver 1135), and/or other components of a mobile UWB device 1100 as illustrated in FIG. 11 and described hereafter.

The functionality at block 1014 includes receiving, from the initiator, the CSR. As noted above, in some embodiments, the CSR may be determined by generating the interference profile of the first cluster based on one or more RF scans performed during a ranging block in a UWB positioning session. Means for performing functionality at block 1014 may comprise a bus 1205, processor(s) 1210, memory 1260, wireless communication interface 1230 (including optional UWB transceiver 1235), and/or other components of a stationary UWB device 1200 as illustrated in FIG. 12 and described hereafter.

In some embodiments, the initiator may transmit, the CSR to the controller for scheduling information exchange among the plurality of anchor cluster. In some embodiments, the CSR may indicate any interferences determined by the initiator and/or the responder. Or, in some other embodiments, the CSR may only indicate interferences that are above a predetermined threshold of detected signal strength (e.g., the level of the interference meets a certain threshold). In some embodiments, after the interferences have been determined, a signal to interference & noise ratio (SINR) value for the corresponding channel and slot may also be determined and may be included in the CSR for indicating the interference profile of the cluster.

The functionality at block 1016 includes scheduling the information exchange among the multi-cluster deployment based on the CSRs. As noted, according to some embodiments, based on the one or more CSRs received by the logical controller (e.g., logical controller 610 in FIG. 6), in the next ranging block, the logical controller may schedule at least a portion of the ranging rounds assigned to different clusters to overlap in time. For example, as illustrated in FIG. 8, the logical controller may overlap at least a portion of ranging rounds #1 with #2, #2 with #3, #3 with #4, or any of the combination thereof. For example, based on the CSRs indicating the interference profiles (e.g., indicating interferences on the specified channel) of each cluster, the logical controller may schedule the communication on different clusters such that at some time point(s), different clusters may communicate simultaneously using a same or different channels. In some embodiments, the logical controller may schedule the ranging rounds based on FDMA, where different clusters may use different channels to transmit messages simultaneously. In some embodiments, the logical controller may also schedule the ranging rounds based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level.

In some embodiments, based on the one or more CSRs received by the logical controller, in the next ranging block, the logical controller may also schedule at least a portion of the ranging slots in a control phase (e.g., beacon-only period in the superframe structure) assigned to different clusters to overlap in time. For example, as illustrated in FIG. 9, the logical controller may overlap a portion of ranging lots 1 with 2, and/or 8 with 9. For example, based on the CSRs indicating the interference profiles of the clusters (e.g., on specified channels), the logical controller may schedule the information relay on different clusters such that at some time point(s), different clusters may pass on information simultaneously using different channels. In some embodiments, the logical controller may schedule the ranging rounds based on FDMA, where different clusters may use different channels to transmit messages. In some embodiments, the logical controller may also schedule the ranging slots in the control phase based on frequency reuse, where two non-neighboring clusters (e.g., clusters 410 and 430 in FIG. 4) may share a same channel and transmit messages simultaneously, when for example, the determined interference caused by the non-neighboring cluster is below the predetermined threshold/level. Means for performing functionality at block 1016 may comprise a bus 1205, processor(s) 1210, memory 1260, wireless communication interface 1230 (including optional UWB transceiver 1235), and/or other components of a stationary UWB device 1200 as illustrated in FIG. 12 and described hereafter.

FIG. 11 is a block diagram of an embodiment of a mobile UWB device 1100, which can be utilized as described herein. The mobile UWB device 1100 may have cellular (e.g., 5G NR) capabilities and may therefore function as a UE in an cellular wireless network and/or perform cellular/UWB positioning as described herein. It should be noted that FIG. 11 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the UE discussed in the previously described embodiments may be executed by one or more of the hardware and/or software components illustrated in FIG. 11.

The mobile UWB device 1100 is shown comprising hardware elements that can be electrically coupled via a bus 1105 (or may otherwise be in communication, as appropriate). The hardware elements may include processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The mobile UWB device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile UWB device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1100 to communicate with other devices as described herein. The wireless communication interface 1130 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

As illustrated, the wireless indication interface 1130 may further comprise a UWB transceiver 1135. The UWB transceiver 1135 may be operated to perform the UWB operations described herein. Further, the wireless communications interface 1130 may comprise one or more additional communication technologies with which any OOB functionalities described herein may be performed. According to some embodiments, the UWB transceiver 1135 may be one of a plurality of UWB transceivers of the mobile UWB device 1100. Further, the UWB transceiver may be used for functionality in addition to the UWB positioning functionality described herein. Although illustrated as part of the wireless communication interface 1130, the UWB transceiver 1135 may be separate from the wireless communication interface 1130 in some embodiments.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1100 may communicate with different data networks that may comprise various network types. For example, a WWAN may be a CDMA network, a TDMA network, a FDMA network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1100 may also include a GNSS receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the mobile UWB device 1100, using conventional techniques, from GNSS satellites of a GNSS system, such as GPS, Galileo, GLONASS, Quasi-Zenith Satellite System (QZSS) over Japan, IRNSS over India, BeiDou Navigation Satellite System (BDS) over China, and/or the like. Moreover, the GNSS receiver 1180 can be used with various+storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile UWB device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile UWB device 1100 (and/or processor(s) 1110 or DSP 1120 within mobile UWB device 1100). In some embodiments, then, such code and/or instructions can be used to configure and/or adapt a general-purpose computer (or other device) to perform one or more operations in accordance with the described methods.

FIG. 12 is a block diagram of an embodiment of a stationary UWB device 1200, which can be utilized as described herein. The stationary UWB device 1200 may, for example, function as a UWB anchor for UWB and/or hybrid cellular/UWB positioning of a mobile UWB device (e.g., mobile UWB device 1100). It should be noted that FIG. 12 is meant only to provide a generalized illustration of various components, any or all of which may be utilized as appropriate. In some embodiments, the stationary UWB device 1200 may correspond to an anchor UWB having a known location, which may be used to determine the location of other UWB devices, including mobile UWB devices. According to some embodiments, the stationary UWB device 1200 may be permanently stationary or temporarily stationary.

The stationary UWB device 1200 is shown comprising hardware elements that can be electrically coupled via a bus 1205 (or may otherwise be in communication, as appropriate). The hardware elements may include a processor(s) 1210 which can include without limitation one or more general-purpose processors, one or more special-purpose processors (such as DSP chips, graphics acceleration processors, ASICs, and/or the like), and/or other processing structure or means. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below), according to some embodiments. The stationary UWB device 1200 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1200 might also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1200 to communicate as described herein. The wireless communication interface 1230 may permit data and signaling to be communicated (e.g., transmitted and received) to mobile devices, wireless network nodes (e.g., base stations, access points, etc.), and/or other network components, computer systems, and/or any other electronic devices described herein. The communication can be carried out via one or more wireless communication antenna(s) 1232 that send and/or receive wireless signals 1234.

As illustrated, the wireless indication interface 1230 may further comprise a UWB transceiver 1235. The UWB transceiver 1235 may be operated to perform the UWB operations described herein. Further, the wireless communications interface 1230 may comprise one or more additional communication technologies with which any OOB functionalities described herein may be performed. According to some embodiments, the UWB transceiver 1235 may be one of a plurality of UWB transceivers of the mobile UWB device 1200. Further, the UWB transceiver may be used for functionality in addition to the UWB positioning functionality described herein. Although illustrated as part of the wireless communication interface 1230, the UWB transceiver 1235 may be separate from the wireless communication interface 1230 in some embodiments.

The stationary UWB device 1200 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein. In some embodiments, the stationary UWB device 1200 may be communicatively coupled with one or more servers and/or other stationary UWB devices via the network interface 1280.

In many embodiments, the stationary UWB device 1200 may further comprise a memory 1260. The memory 1260 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1260 of the stationary UWB device 1200 also may comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the stationary UWB device 1200 (and/or processor(s) 1210 or DSP 1220 within stationary UWB device 1200). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for cross-cluster coordination in ultra-wideband (UWB) wireless positioning performed by an initiator of a first cluster, the method comprising receiving, from a controller of a plurality of clusters that includes the first cluster, a request for a channel scan report (CSR) indicating interferences in a wireless positioning performed by the first cluster, wherein the interferences are caused by information exchange among the plurality of clusters, generating an interference profile of the first cluster based on one or more radio frequency (RF) scans performed during a ranging block in a UWB positioning session, determining the CSR based on the interference profile of the first cluster, and transmitting, the CSR to the controller for scheduling information exchange among the plurality of clusters.

Clause 2. The one or more RF scans are performed by other anchors in the first cluster, and wherein determinations of the one or more RF scans are transmitted to the initiator in one or more sub-CSRs.

Clause 3. The one or more sub-CSRs are transmitted during a ranging phase of a first ranging round of the ranging block assigned to the first cluster.

Clause 4. Scheduling information exchange among the plurality of clusters is performed via frequency division multiple access (FDMA) or frequency reuse.

Clause 5. The one or more RF scans of the ranging block comprises scanning a second ranging round of the ranging block assigned to a second cluster of the plurality of clusters.

Clause 6. Scheduling information exchange among the plurality of clusters comprises scheduling at least a portion of the first ranging round by overlapping in time with the second ranging round and based on the CSR.

Clause 7. Scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

Clause 8. The CSR comprises reporting interferences in the wireless positioning performed by the first cluster that are above a predetermined threshold of detected signal strength.

Clause 9. A method of cross-cluster coordination in ultra-wideband (UWB) positioning performed by a controller of a plurality of clusters, the method comprising configuring an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session, receiving, from the initiator, the CSR, and scheduling information exchange among the plurality of clusters based on the CSR.

Clause 10. The one or more RF scans are performed by other anchors in the first cluster, and wherein determinations of the one or more RF scans are transmitted to the initiator in one or more sub-CSRs.

Clause 11. The one or more sub-CSRs are transmitted during a ranging phase of a first ranging round of the ranging block assigned to the first cluster.

Clause 12. Scheduling information exchange among the plurality of clusters is performed via frequency division multiple access (FDMA) or frequency reuse.

Clause 13. The one or more RF scans of the ranging block comprises scanning a second ranging round of the ranging block assigned to a second cluster of the plurality of clusters.

Clause 14. Scheduling information exchange among the plurality of clusters comprises scheduling at least a portion of the first ranging round by overlapping in time with the second ranging round and based on the CSR.

Clause 15. Scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

Clause 16. The CSR comprises reporting interferences in the wireless positioning performed by the first cluster that are above a predetermined threshold of detected signal strength.

Clause 17. The CSR comprises reporting every interference in the wireless positioning performed by the first cluster that is determined by the initiator.

Clause 18. A transmitting device in a wireless communication network, comprising a wireless communication interface and one or more processing units communicatively coupled to the wireless communication interface and the memory, the one or more processing units configured to receive, from a controller of a plurality of clusters that includes the first cluster, a request for a channel scan report (CSR) indicating interferences in a wireless positioning performed by the first cluster, wherein the interferences are caused by information exchange among the plurality of clusters, generating an interference profile of the first cluster based on one or more radio frequency (RF) scans performed during a ranging block in a UWB positioning session, determining the CSR based on the interference profile of the first cluster, and transmit, the CSR to the controller for scheduling information exchange among the plurality of clusters.

Clause 19. The one or more RF scans are performed by other anchors in the first cluster, and wherein determinations of the one or more RF scans are transmitted to the initiator in one or more sub-CSRs.

Clause 20. The one or more sub-CSRs are transmitted during a ranging phase of a first ranging round of the ranging block assigned to the first cluster.

Clause 21. Scheduling information exchange among the plurality of clusters is performed via frequency division multiple access (FDMA) or frequency reuse.

Clause 22. The one or more RF scans of the ranging block comprises scanning a second ranging round of the ranging block assigned to a second cluster of the plurality of clusters.

Clause 23. Scheduling information exchange among the plurality of clusters comprises scheduling at least a portion of the first ranging round by overlapping in time with the second ranging round and based on the CSR.

Clause 24. Scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

Clause 25. A server comprising a transceiver, a memory, and one or more processing units communicatively coupled with the transceiver and the memory, the one or more processing units configured to configure an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session, receive, from the initiator, the CSR, and schedule information exchange among the plurality of clusters based on the CSR.

Clause 26. The one or more RF scans are performed by other anchors in the first cluster, and wherein determinations of the one or more RF scans are transmitted to the initiator in one or more sub-CSRs.

Clause 27. The one or more sub-CSRs are transmitted during a ranging phase of a first ranging round of the ranging block assigned to the first cluster.

Clause 28. Schedule information exchange among the plurality of clusters is performed via frequency division multiple access (FDMA) or frequency reuse.

Clause 29. The one or more RF scans of the ranging block comprises scanning a second ranging round of the ranging block assigned to a second cluster of the plurality of clusters.

Clause 30. Schedule information exchange among the plurality of clusters comprises scheduling information exchange among the plurality of clusters comprises scheduling at least a portion of the first ranging round by overlapping in time with the second ranging round and based on the CSR.

Clause 31. Schedule information exchange among the plurality of clusters comprises scheduling a control phase of the ranging block by overlapping in time a first ranging slot of the control phase assigned to the first cluster with a second ranging slot of the control phase assigned to the second cluster and based on the CSR.

What is claimed is:

1. A method of cross-cluster coordination in ultra-wideband (UWB) wireless positioning performed by an initiator of a first cluster, the method comprising:

receiving, from a controller of a plurality of clusters that includes the first cluster, a request for a channel scan report (CSR) indicating interferences in a wireless positioning performed by the first cluster, wherein the interferences are caused by information exchange among the plurality of clusters;

generating an interference profile of the first cluster based on one or more radio frequency (RF) scans performed during a ranging block in a UWB positioning session;

determining the CSR based on the interference profile of the first cluster; and transmitting the CSR to the controller for scheduling information exchange among the plurality of clusters.

2. The method of claim 1, wherein the one or more RF scans are performed by other anchors in the first cluster, and wherein determinations of the one or more RF scans are transmitted to the initiator in one or more sub-CSRs.

3. The method of claim 2, wherein the one or more sub-CSRs are transmitted during a ranging phase of a first ranging round of the ranging block assigned to the first cluster.

4. The method of claim 3, wherein scheduling information exchange among the plurality of clusters is performed via frequency division multiple access (FDMA) or frequency reuse.

5. The method of claim 4, wherein the one or more RF scans of the ranging block comprises scanning a second ranging round of the ranging block assigned to a second cluster of the plurality of clusters.

6. The method of claim 5, wherein scheduling information exchange among the plurality of clusters comprises scheduling at least a portion of the first ranging round by overlapping in time with the second ranging round and based on the CSR.

7. The method of claim 5, wherein scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

8. The method of claim 1, wherein the CSR comprises reporting interferences in the wireless positioning performed by the first cluster that are above a predetermined threshold of detected signal strength.

9. A method of cross-cluster coordination in ultra-wide-band (UWB) positioning performed by a controller of a plurality of clusters, the method comprising:

configuring an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session;

receiving, from the initiator, the CSR; and scheduling information exchange among the plurality of clusters and based on the CSR.

10. The method of claim 9, wherein the one or more RF scans are performed by other anchors in the first cluster, and wherein determinations of the one or more RF scans are transmitted to the initiator in one or more sub-CSRs.

11. The method of claim 10, wherein the one or more sub-CSRs are transmitted during a ranging phase of a first ranging round of the ranging block assigned to the first cluster.

12. The method of claim 11, wherein scheduling information exchange among the plurality of clusters is performed via frequency division multiple access (FDMA) or frequency reuse.

13. The method of claim 12, wherein the one or more RF scans of the ranging block comprises scanning a second ranging round of the ranging block assigned to a second cluster of the plurality of clusters.

14. The method of claim 13, wherein scheduling information exchange among the plurality of clusters comprises scheduling at least a portion of the first ranging round by overlapping in time with the second ranging round and based on the CSR.

15. The method of claim 14, wherein scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

16. The method of claim 9, wherein the CSR comprises reporting interferences in the wireless positioning performed by the first cluster that are above a predetermined threshold of detected signal strength.

17. The method of claim 9, wherein the CSR comprises reporting every interference in the wireless positioning performed by the first cluster that is determined by the initiator.

18. A transmitting device in a wireless communication network, comprising:

a wireless communication interface; and one or more processing units communicatively coupled to the wireless communication interface and the memory, the one or more processing units configured to:

receive, from a controller of a plurality of clusters that includes the first cluster, a request for a channel scan report (CSR) indicating interferences in a wireless positioning performed by the first cluster, wherein the interferences are caused by information exchange among the plurality of clusters;

generate an interference profile of the first cluster based on one or more radio frequency (RF) scans performed during a ranging block in a UWB positioning session;

determine the CSR based on the interference profile of the first cluster; and transmit, the CSR to the controller for scheduling information exchange among the plurality of clusters.

19. The transmitting device of claim 18, wherein the one or more RF scans are performed by other anchors in the first cluster, and wherein determinations of the one or more RF scans are transmitted to the initiator in one or more sub-CSRs.

20. The transmitting device of claim 19, wherein the one or more sub-CSRs are transmitted during a ranging phase of a first ranging round of the ranging block assigned to the first cluster.

21. The transmitting device of claim 20, wherein scheduling information exchange among the plurality of clusters is performed via frequency division multiple access (FDMA) or frequency reuse.

22. The transmitting device of claim 21, wherein the one or more RF scans of the ranging block comprises scanning a second ranging round of the ranging block assigned to a second cluster of the plurality of clusters.

23. The transmitting device of claim 22, wherein scheduling information exchange among the plurality of clusters comprises scheduling at least a portion of the first ranging round by overlapping in time with the second ranging round and based on the CSR.

24. The transmitting device of claim 22, wherein scheduling information exchange among the plurality of clusters comprises scheduling a control phase of the ranging block by overlapping in time a first ranging slot of the control phase assigned to the first cluster with a second ranging slot of the control phase assigned to the second cluster and based on the CSR.

25. A server comprising:

a transceiver;

a memory; and one or more processing units communicatively coupled with the transceiver and the memory, the one or more processing units configured to:

configure an initiator of a first cluster of the plurality of clusters to determine a channel scan report (CSR), indicating interferences in a wireless positioning performed by the first cluster, wherein the interferences are caused by information exchange among the plurality of clusters, and wherein the CSR is determined by generating an interference profile of the first cluster based on one or more radio frequency (RF) scans performed during a ranging block in a UWB positioning session;

receive, from the initiator, the CSR; and schedule information exchange among the plurality of clusters based on the CSR.

26. The server of claim 25, wherein the one or more RF scans are performed by other anchors in the first cluster, and wherein determinations of the one or more RF scans are transmitted to the initiator in one or more sub-CSRs.

27. The server of claim 26, wherein the one or more sub-CSRs are transmitted during a ranging phase of a first ranging round of the ranging block assigned to the first cluster.

28. The server of claim 27, wherein schedule information exchange among the plurality of clusters is performed via frequency division multiple access (FDMA) or frequency reuse.

29. The server of claim 28, wherein the one or more RF scans of the ranging block comprises scanning a second ranging round of the ranging block assigned to a second cluster of the plurality of clusters.

30. The server of claim 29, wherein schedule information exchange among the plurality of clusters comprises scheduling information exchange among the plurality of clusters comprises scheduling at least a portion of the first ranging round by overlapping in time with the second ranging round and based on the CSR.

31. The server of claim 29, wherein schedule information exchange among the plurality of clusters comprises scheduling a control phase of the ranging block by overlapping in time a first ranging slot of the control phase assigned to the first cluster with a second ranging slot of the control phase assigned to the second cluster and based on the CSR.

* * * * *